Nov. 11, 1952  C. W. LINCOLN ET AL  2,617,902
DIRECTION SIGNAL DEVICE
Filed May 18, 1950  2 SHEETS—SHEET 1
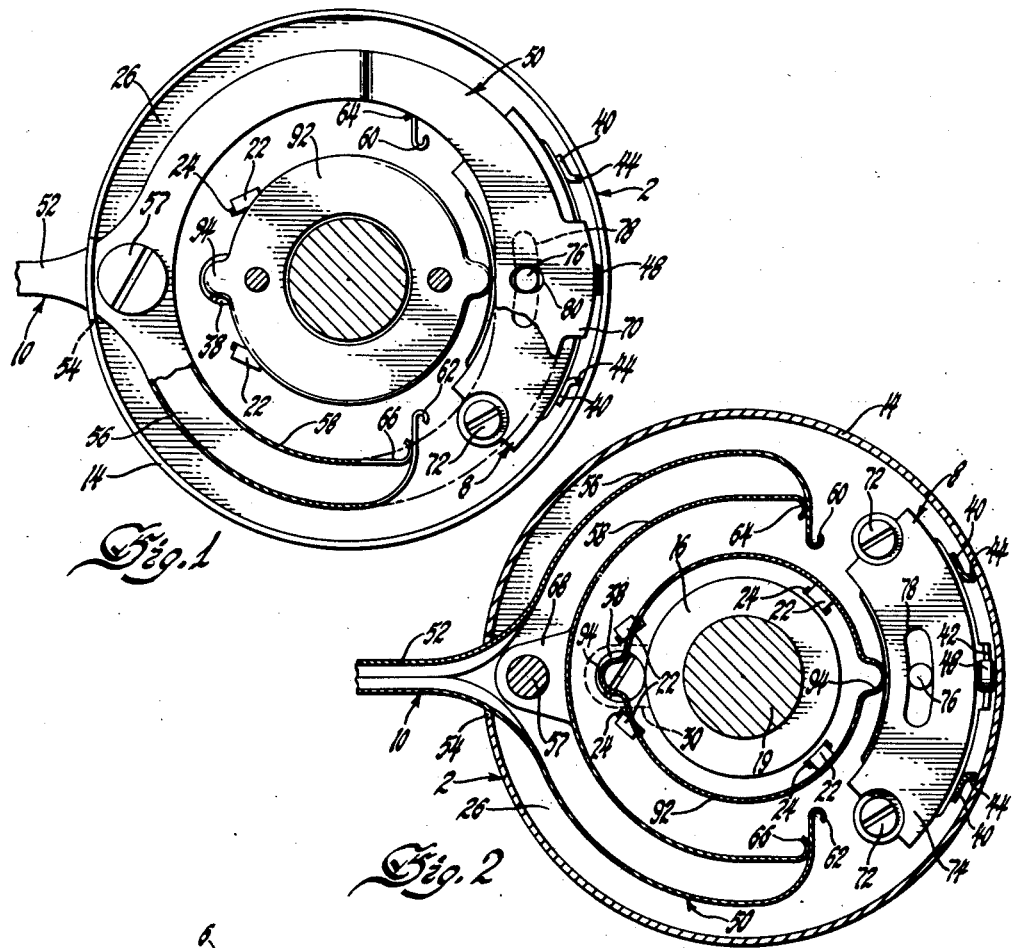
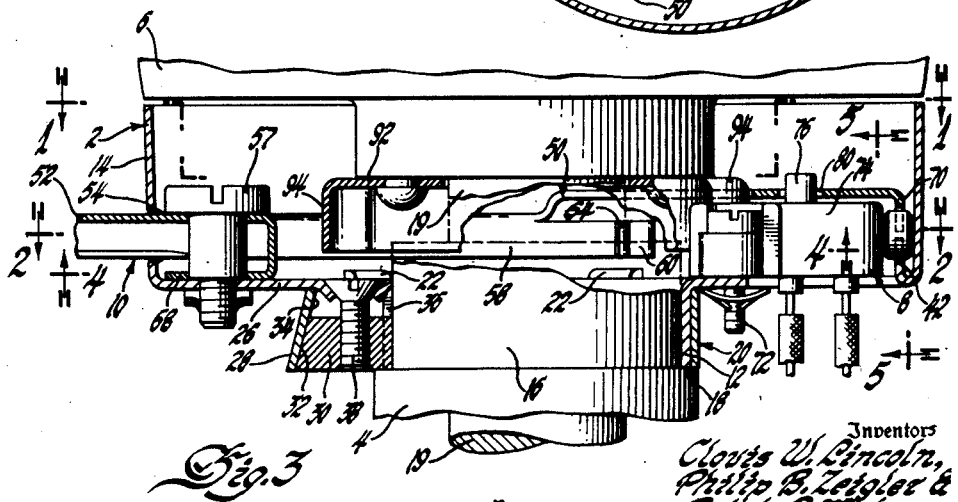

Nov. 11, 1952     C. W. LINCOLN ET AL     2,617,902
DIRECTION SIGNAL DEVICE

Filed May 18, 1950     2 SHEETS—SHEET 2

Inventors
Clovis W. Lincoln,
Philip B. Zeigler &
Ralph Q. Malone
Willits Helwig & Baillio
Attorneys Patented Nov. 11, 1952

2,617,902

UNITED STATES PATENT OFFICE 2,617,902

DIRECTION SIGNAL DEVICE

Clovis W. Lincoln and Philip B. Zeigler, Saginaw, and Ralph A. Malone, Chesaning, Mich., assignors to General Motors Corporation, Detroit, Mich., a corporation of Delaware Application May 18, 1950, Serial No. 162,696

12 Claims. (Cl. 200—59)

1

The present invention relates to vehicle direction signaling systems and more particularly to devices for controlling such systems.

An object of the invention is to provide a direction signaling device of the manually set and automatically reset type which is simple and inexpensive and especially adapted to mass production.

This and other objects are attained in accordance with the present invention by providing a direction signaling device formed substantially entirely of sheet metal stampings with an integral single piece operating mechanism for obtaining the setting and resetting operations of the device in a vehicle signaling system.

Figure 4:
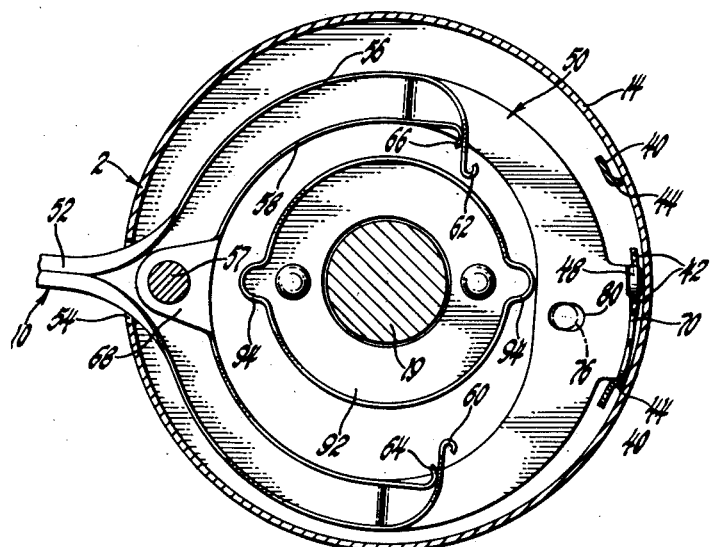
Figure 5:
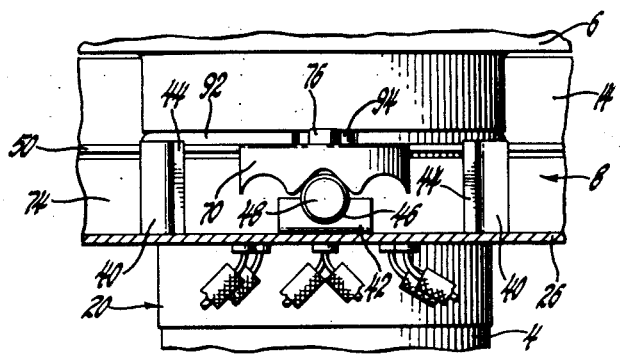
Figure 6:
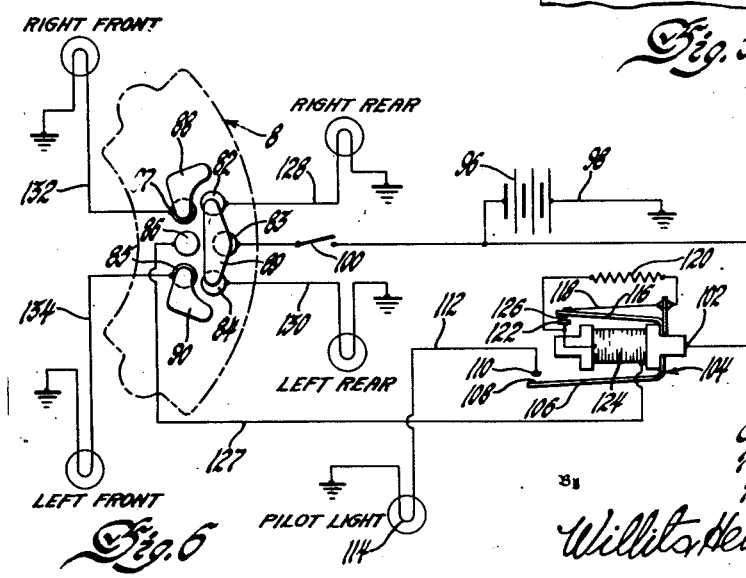

For a better understanding of the invention reference may be had to the drawings in which Figure 1 is a top plan view of the direction signaling device of our invention taken along the line 1—1 of Figure 3; Figure 2 is a view similar to Figure 1, taken along the line 2—2 of Figure 3; Figure 3 is an enlarged vertical cross-sectional view of the device; Figure 4 is a bottom plan view taken along the line 4—4 of Figure 3; Figure 5 is a fragmentary view taken along the line 5—5 of Figure 3 and Figure 6 is a diagrammatic view of a typical vehicle direction signaling system adapted to be controlled by the device of the present invention.

Referring now to the drawings and particularly Figures 1 through 5 inclusive, there is illustrated the direction signaling device of the present invention comprising a housing 2 adapted to be attached to the steering column 4 of an automotive vehicle adjacent the steering wheel 6, a multi-pole electrical switch 8 supported in the housing and an operating lever assembly 10 pivotally mounted in the housing to engage and actuate the switch.

The housing 2 is a substantially cup-shaped member formed from sheet metal by a stamping or drawing operation with a downwardly depending circular flange or collar 12 substantially concentric with its side wall portion 14. The collar 12 passes over the reduced end portion 16 of the steering column 4 with its edge engaging the ledge 18 and provides means for positioning the housing substantially concentrically with the steering shaft 19 and adjacent to the hub of the steering wheel. To provide means for securing the housing to the steering column a substantially eccentrically shaped clamping collar 20 surrounds the collar 12 and is secured to the housing by fastening ears 22 extending from the upper edge of collar through slots 24 in the radially extending portion 26 of the housing. The ears 22 may be twisted or bent back upon the radially extending portion 26 as shown. The non-circular portion 28 of the clamping collar provides space between the collars for receiving a clamping wedge 30 which is formed with a vertically inclined surface portion 32 adapted to engage and cooperate with a similarly inclined surface 34 of the clamping collar to secure radial adjustment of the wedge against the surface of the steering column through a slot 36, see Figure 3, in the wall of collar 12. The clamping wedge 30 is adjustably secured in the space formed between the non-circular portion 28 of clamping collar 20 and collar 12 by a threaded member 38.

To provide means in the housing for cooperating with the lever 10 to limit its pivotal movement and position it at its neutral and operating positions, stopping lugs 40 and index roller supporting lug 42 are sheared from the radially extending portion 26 of the housing during the stamping or drawing operation. The lugs are bent back along the side wall portion 14 with the adjacent edge portion 44 of the stopping lugs 40 further bent in the direction of the side wall as shown. The index roller supporting lug 42 is formed at its upper edge with a semi-circular slot 46, see Figure 5, which is adapted to receive the indexing roller 48. The roller 48 is held in the slot against radial movement in the housing by the casing of switch 8 and the side wall 14 of the housing.

The operating lever assembly 10 like the housing is formed from an integral single piece metal stamping and comprises a ring portion 50 and a handle 52 which extends outwardly from the ring portion through an aperture 54 in the housing wall. The operating lever assembly is pivotally secured within the housing by a threaded member 57. In forming the operating lever assembly from the metal stamping the edges of the stamping providing the handle portion 52 are turned inwardly into juxtaposition forming the rounded, substantially cylindrical handle. Where the handle joins the ring portion the stamping edges are turned downwardly forming the depending flanges 56 and 58. The flanges 56 and 58 form a channel section which extends around the ring portion to positions substantially oppositely disposed from the steering shaft 19. Extending from the ends of the depending flange 56 are the integral inwardly turned resilient lugs or fingers 60 and 62 which project into the inner space outlined by the ring portion to provide means for returning the ring portion to a neutral position in a manner which will be described hereinafter.

Extending from the ends of the flange 58 there are a pair of cooperating lugs 64 and 66 the ends of which abut the sides of lugs 60 and 62. Turned backwardly in the direction of the handle portion is an ear 68 which slidably engages the radially extending wall 26 and is provided with an aperture which in cooperation with an aligned aperture in the upper wall of the stamping receives the threaded member 57 to pivotally mount the operating lever assembly in the housing. Substantially oppositely disposed from the handle portion 52 is a downwardly depending flange 70, in Figure 5, provided with an undulated edge which engages the roller 48 to index the operating lever assembly in either of its operating positions or its neutral position, as shown.

The multi-pole switch 8 is secured to the radially extending portion 26 of the housing by threaded members 72 and is of a well-known construction comprising a terminal plate forming one wall of the housing 74 and a slidable member in the switch housing with an arm 76 extending through an aperture 78 in the housing to pass through an aperture 80 in the ring portion of the operating lever assembly. The terminal plate is provided with a plurality of contact terminals 82, 83, 84, 85, 86 and 87, see Figure 6, in which cooperation with the contact bridging members 88, 89 and 90 on the sliding member provide for energization of various predetermined signal circuits in a direction signaling system.

Secured to the hub of the steering wheel 6 is a plate 92 having oppositely disposed downwardly depending ears 94 which rotate with the steering wheel and in a circular path within the space outlined by the ring portion of the operating lever assembly.

In operation the operating lever assembly may be rotated in either a clockwise or counterclockwise direction about the threaded member 57 to place either of the spring fingers 60 or 62 into the circular path of the ears 94 depending from plate 92. With the operating lever assembly rotated in a counterclockwise direction a like counterclockwise rotation of the steering wheel 6 and plate 92 will cause one of the ears 94 to engage the finger 62 moving it out of the path of the ear because of the resiliency of the finger 62. However, upon reversal of the direction of rotation of the steering wheel the ear 94 upon engaging finger 62 forces the operating lever assembly to rotate in a clockwise direction to clear finger 62; the movement of the resilient finger to clear the path of the ear 94 being resisted by the abutting lug 66. With a rotation of the operating lever in a clockwise direction the return of the operating lever assembly to its neutral position is similarly obtained, as will be obvious.

In Figure 6 there is illustrated a schematic diagram of a well-known direction signaling system which the turn signal device of our invention is particularly adapted to control. In the system there is a battery 96 having one terminal connected to ground through the conductor 98. The other terminal of the battery is connected to contact terminal 83 of switch 8 through a brake operated switch 100 and to the input terminal 102 of a current interrupter 104 of well-known construction. In passing through the current interrupter 104 current may pass from the input terminal 102 through an armature 106, shown in a normally open position and a contact 108 carried thereby to a contact 110 and conductor 112 to one terminal of the grounded filament 114 of a pilot lamp. The current may also pass from the input terminal 102 through a second armature 116, a temperature responsive wire 118, a resistor 120 to a contact terminal 122 and a solenoid coil 124 of the interrupter. The armature 116 is provided with a contact 126 adapted to close on contact 122 to bypass the temperature responsive wire 118 and resistor 120 and is yieldingly urged to the normally open position, as shown, by the temperature responsive wire 118. The output terminal of the solenoid coil 124 is connected by conductor 127 to contact terminal 86 of the switch 8. The grounded filaments of the right and left rear signaling lamps are connected respectively through conductors 128 and 130 to contact terminals 82 and 84 while the grounded filaments of the right and left front signaling lamps are connected respectively through conductors 132 and 134 to contact terminals 87 and 85.

In the system, operation with the operating lever assembly rotated in a counterclockwise direction for a left turn signal, contact bridging member 90 bridges contact terminals 84, 85 and 86 to provide current to the left front and rear signaling lamps from the battery through the interrupter and conductor 127. With current passing through the temperature responsive wire 118, it expands and the solenoid 124 exerts a magnetic pulling force on armature 116 causing contact 126 to close on contact 122 thus bypassing wire 118 and resistor 120. With resistor 120 out of the circuit sufficient current passes to the filaments of the signaling lamps to cause them to glow. Likewise, contact 108 closes on contact causing the pilot lamp to glow. As the temperature responsive wire 118 is cooled it contracts, disconnecting contacts 122 and 126 and placing resistor 120 in the circuit to the lamps, reducing the current flow so that insufficient current is provided to the lamp filaments to continue their glowing. Consequently, there is an alternate flashing of the signaling lamps to provide a signal. With the operating lever assembly and switch in the above described position, bridging member 89 bridges contacts 82 and 83 to provide steady current flow to the grounded filament of the right rear signaling lamp when the brake switch is closed indicating a stop.

As the steering wheel 6 is rotated in a counterclockwise direction to make a left turn the depending ears 94 pass by the spring finger 62 as hereinabove described. Upon reversal of the direction of rotation of the steering wheel, the operating lever assembly is returned to its neutral position with a corresponding return of switch 8 to its neutral position shown in Figure 6, and the signaling lamps are deenergized. In the neutral position of switch 8, the closing of brake switch 100 provides a steady current flow to the grounded filaments of both the right and left rear signaling lamps. For a right turn signal indication the operation of the device and system is substantially the same.

A device such as we have described provides an inexpensive and simple mechanism for accomplishing the semi-automatic switching arrangements in any suitable direction signaling system.

What we claim as new and desire to secure by Letters Patent of the United States is:

1. In a direction signaling device, an operating lever pivotally mounted therein, said lever comprising a ring portion and a handle portion extending therefrom, a plurality of resilient fingers integral with said ring portion and extending inwardly thereof and an electrical switch mounted in said device to be actuated by said operating lever.

2. In a direction signaling device, a support, an operating lever pivotally mounted on said support and comprising a ring portion and a handle extending from said ring portion, a plurality of resilient fingers extending inwardly from said ring portion, said fingers being integral with said ring portion, and an electrical switch mounted on said support for actuation by said operating lever.

3. In a direction signaling device, a housing adapted to be attached to the steering column of an automotive vehicle adjacent the steering wheel thereof, an operating lever pivotally supported in said housing, said lever comprising an annular ring portion and a handle extending therefrom, a plurality of resilient fingers extending inwardly of said ring portion and integral therewith and an electrical switch mounted in said housing for actuation by said operating lever.

4. In a direction signal device, a housing adapt to be attached to the steering column of an automotive vehicle adjacent the steering wheel thereof, an operating lever assembly pivotally supported in said housing, said assembly comprising an annular ring portion and an operating handle extending therefrom, said ring portion havig a flange depending from said ring portion, resilient fingers extending from said flange and inwardly of said ring portion, said fingers being integral with said flange, and an electrical switch mounted in said housing for actuation by said assembly.

5. In a direction signaling device, a housing adapted to be attached to the steering column of an automotive vehicle adjacent the steering wheel thereof, an operating lever assembly pivotally mounted in said housing, said assembly comprising an annular ring portion and an operating handle extending therefrom through said housing, flanges extending from said ring portion to form substantially a channel section thereon, resilient fingers extending from one of said flanges and inwardly of said ring portion, lugs extending from the other of said flanges and engaging said fingers and an electrical switch mounted in said housing for actuation by said assembly.

6. In a direction signaling device, a housing adapted to be attached to the steering column of an automotive vehicle adjacent the steering wheel thereof, an operating lever assembly pivotally mounted in said housing, said assembly comprising an annular ring portion and an operating lever extending therefrom and through said housing, flanges extending downwardly from said ring portion to form a channel section and extending through substantially half of the circumference of said ring portion, a plurality of resilient fingers extending inwardly of said ring portion from the ends of one of said flanges and integral therewith, a plurality of lugs extending from the ends of the other flange and in engagement with said fingers, means for indexing the movement of said assembly in said housing and an electrical switch mounted in said housing with its operating arm in engagement with said ring portion for actuation by said assembly.

7. In combination with an automotive vehicle having a steering column and a steering wheel with ears projecting therefrom, a direction signaling device comprising a housing adapted to be attached to said steering column adjacent said steering wheel, an operating lever assembly pivotally mounted in said housing, said assembly having a ring portion substantially concentric with said column and an operating lever extending therefrom, a plurality of resilient fingers extending inwardly from said ring portion and integral therewith, said fingers being movable into the path of said ears for actuation thereby and an electrical switch mounted in said housing with its operating arm engaging said ring portion.

8. In a direction signaling device a housing comprising a cup-shaped metal stamping adapted to pivotally support a switch operating mechanism therein, said stamping having an internal lug sheared from the wall of said stamping and formed to provide a support and a member carried by said support for indexing said operating mechanism.

9. In a direction signaling device, an operating lever comprising a ring portion and a handle portion extending therefrom, a pivotal mount for said operating lever located at a point on said ring portion, a plurality of resilient fingers integral with said ring portion and extending inwardly thereof, and an electrical switch mounted in said device to be actuated by said operating lever.

10. In a direction signaling device, a support, an operating lever pivotally mounted on said support and comprising a ring portion and a handle extending from said ring portion, an electrical switch mounted on said support for actuating by said operating lever, and means for indexing the movement of said lever including a flange integral with said ring portion and having an undulated surface and a bearing member mounted in said housing and engaging said undulated surface.

11. In a direction signaling device, an operating lever comprising a ring portion and a handle portion, a pivotal support for said operating lever located at a point on said ring portion at the junction of said ring portion and said handle portion, operating lever indexing means located on said ring portion and an electrical switch mounted in said device actuated by said operating lever.

12. In a direction signaling device, a housing adapted to be attached to the steering column of an automotive vehicle adjacent the steering wheel thereof, an operating lever pivotally supported in said housing, said lever comprising a ring portion and a handle extending therefrom, said housing comprising a cup-shaped stamping having integral lugs sheared from the walls of said stamping and formed to limit the pivotal movement of said operating lever.

CLOVIS W. LINCOLN.
PHILIP B. ZEIGLER.
RALPH A. MALONE.

REFERENCES CITED

The following references are of record in the file of this patent:

UNITED STATES PATENTS

| Number | Name | Date |
| --- | --- | --- |
| 1,532,563 | Voigt | Apr. 7, 1925 |
| 2,034,414 | Pagendarm | Mar. 17, 1936 |
| 2,261,817 | Wilshusen | Nov. 4, 1941 |
| 2,334,882 | Muhleck | Nov. 23, 1943 |
| 2,343,355 | Yanchenko | Mar. 7, 1944 |